(12) United States Patent
Claywell et al.

(10) Patent No.: US 12,228,202 B1
(45) Date of Patent: Feb. 18, 2025

(54) HYDRAULIC FLUID PICK-UP TUBE

(71) Applicant: GM GLOBAL TECHNOLOGY OPERATIONS LLC, Detroit, MI (US)

(72) Inventors: Mark Claywell, Birmingham, MI (US); Sean Michael McGowan, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/510,573

(22) Filed: Nov. 15, 2023

(51) Int. Cl.
*F01M 11/06* (2006.01)
*F16H 57/04* (2010.01)

(52) U.S. Cl.
CPC ..... *F16H 57/0443* (2013.01); *F16H 57/0404* (2013.01); *F16H 57/0436* (2013.01); *F16H 57/0452* (2013.01); *F16H 57/0475* (2013.01)

(58) Field of Classification Search
CPC ............. F01M 11/0004; F16H 57/0452; F16H 57/0404; F16H 57/0443
See application file for complete search history.

(56) References Cited

U.S. PATENT DOCUMENTS

| | | | | | |
|---|---|---|---|---|---|
| 2,022,898 | A | * | 12/1935 | Niven | F16N 9/04 184/6.2 |
| 2,440,815 | A | * | 5/1948 | Wharam | F01M 11/065 184/106 |
| 2,938,601 | A | * | 5/1960 | Brafford | F01M 11/065 184/6.2 |
| 3,805,920 | A | * | 4/1974 | Bensinger | F01M 11/065 184/6.5 |
| 4,023,548 | A | * | 5/1977 | Prasch | F01M 11/065 123/196 CP |

(Continued)

FOREIGN PATENT DOCUMENTS

| | | |
|---|---|---|
| DE | 1057822 B | 5/1959 |
| DE | 102017102518 A1 | 8/2018 |

(Continued)

*Primary Examiner* — Michael A Riegelman
(74) *Attorney, Agent, or Firm* — Lorenz & Kopf LLP

(57) ABSTRACT

Vehicles, oil intake systems for vehicles, and methods for manufacturing oil intake systems for vehicles are provided. A method for manufacturing an oil intake system for a vehicle includes providing an oil reservoir having an internal volume with an internal shape including an oil reservoir bottom; determining a selected amount of oil received in the oil reservoir; selecting a maximum positive pitch angle of a first plane of an upper surface of the selected amount of oil in the oil reservoir; selecting a minimum negative pitch angle of a second plane of the upper surface of the selected amount of oil in the oil reservoir; determining a bottom plane at a selected positive distance above the oil reservoir bottom; determining a shape and a size of an oil pick-up tube and of an opening in the oil pick-up tube to locate the opening below the first plane at the maximum positive pitch angle and below the second plane at the minimum negative pitch angle, wherein the opening is defined by a peripheral edge of the oil pick-up tube, wherein the peripheral edge lies substantially within an opening plane, wherein the opening plane has a positive pitch angle of at least half of the maximum positive pitch angle; and fabricating the oil pick-up tube with the shape, the size, and the opening.

20 Claims, 10 Drawing Sheets

(56) References Cited

U.S. PATENT DOCUMENTS

| | | | | |
|---|---|---|---|---|
| 4,352,737 | A * | 10/1982 | Taniguchi | B01D 29/055 210/482 |
| 4,825,825 | A * | 5/1989 | Chino | F02B 75/20 123/195 HC |
| 4,938,184 | A * | 7/1990 | Martin | F01M 11/0004 184/106 |
| 4,995,971 | A * | 2/1991 | Droste | B03C 1/286 184/6.24 |
| 5,014,819 | A * | 5/1991 | Gotou | F01M 11/065 184/6.5 |
| 5,103,782 | A * | 4/1992 | Matsui | F01M 11/0004 184/106 |
| 5,653,205 | A * | 8/1997 | Ozeki | F01M 11/0004 123/196 R |
| 5,937,817 | A * | 8/1999 | Schanz | F16H 57/04 123/196 R |
| 5,975,041 | A * | 11/1999 | Narita | F01M 1/12 123/196 R |
| 6,041,751 | A * | 3/2000 | Kuriyama | F02B 77/00 184/106 |
| 6,340,012 | B1 * | 1/2002 | Yamashita | F01M 11/0004 123/195 C |
| 6,568,509 | B1 * | 5/2003 | Sugiura | F01M 11/0004 184/106 |
| 6,808,575 | B2 * | 10/2004 | Mauelshagen | B29C 65/78 156/308.2 |
| 6,845,743 | B1 * | 1/2005 | Bishop | F01M 11/0004 123/196 R |
| 7,040,454 | B2 * | 5/2006 | Kawamoto | F01M 1/02 123/196 R |
| 7,637,336 | B2 * | 12/2009 | Enomoto | F16H 61/0009 180/69.1 |
| 7,654,241 | B2 * | 2/2010 | Kobayashi | F01M 5/001 184/104.2 |
| 8,292,036 | B2 * | 10/2012 | Nishida | F16H 57/0402 184/6.24 |
| 2003/0029412 | A1 * | 2/2003 | Kato | F01M 5/02 123/195 C |
| 2009/0101441 | A1 * | 4/2009 | Nishida | F16H 57/0402 184/6.24 |
| 2009/0127174 | A1 * | 5/2009 | Shinbori | B01D 35/0273 210/167.08 |
| 2009/0151494 | A1 * | 6/2009 | Cooper | C10M 169/04 508/108 |
| 2010/0199942 | A1 * | 8/2010 | Yamada | F16N 31/004 123/196 R |
| 2014/0166401 | A1 * | 6/2014 | Kubota | F16H 57/0443 184/6.2 |
| 2015/0258885 | A1 * | 9/2015 | Ideshio | B60K 6/48 903/909 |

FOREIGN PATENT DOCUMENTS

| | | | | |
|---|---|---|---|---|
| DE | 102019118252 | A1 | 1/2021 | |
| DE | 102021120732 | A1 | 2/2023 | |
| EP | 1469170 | A2 * | 10/2004 | F01M 11/0004 |
| JP | 07332056 | A * | 12/1995 | |
| JP | 2002180814 | A * | 6/2002 | |
| JP | 2002181170 | A * | 6/2002 | |
| JP | 2004027876 | A * | 1/2004 | |
| JP | 2005120879 | A * | 5/2005 | |
| JP | 2010025287 | A * | 2/2010 | |

* cited by examiner

HYDRAULIC FLUID PICK-UP TUBE

INTRODUCTION

The technical field generally relates to hydraulic fluid pump assemblies, such as oil pump assemblies, and more particularly to pick-up tubes for delivering hydraulic fluid from a reservoir to a pump.

Proper operation of hydraulic fluid pump assemblies is critical to vehicle performance. In particular, the function of pick-up tubes that deliver hydraulic fluid from a reservoir to the pump may impair performance of hydraulic fluid pump assemblies.

Pick-up tubes may suck air through the surface of the fluid and may become blocked by ice or water. Further, certain designs of pick-up tubes can cause an excessive amount of air to come out of solution. This effect reduces the effectiveness of the oil pump even further than typically expected from purely pick-up oil pressure drop alone.

Accordingly, it is desirable to provide fluid intake systems for vehicles and methods for manufacturing fluid intake systems that avoid the above issues. Additionally, other desirable features and characteristics of the present disclosure will become apparent from the subsequent description taken in conjunction with the accompanying drawings and the foregoing introduction.

SUMMARY

A method for manufacturing an oil intake system for a vehicle includes providing an oil reservoir having an internal volume with an internal shape including an oil reservoir bottom; determining a selected amount of oil received in the oil reservoir: selecting a maximum positive pitch angle of a first plane of an upper surface of the selected amount of oil in the oil reservoir; selecting a minimum negative pitch angle of a second plane of the upper surface of the selected amount of oil in the oil reservoir: determining a bottom plane at a selected positive distance above the oil reservoir bottom: determining a shape and a size of an oil pick-up tube and of an opening in the oil pick-up tube to locate the opening below the first plane at the maximum positive pitch angle and below the second plane at the minimum negative pitch angle, wherein the opening is defined by a peripheral edge of the oil pick-up tube, wherein the peripheral edge lies substantially within an opening plane, wherein the opening plane has a positive pitch angle of at least 30% of the maximum positive pitch angle; and fabricating the oil pick-up tube with the shape, the size, and the opening.

In certain embodiments of the method, the positive pitch angle of the opening plane is from at least 30% of the maximum positive pitch angle to 120% of the maximum positive pitch angle.

In certain embodiments of the method, the positive pitch angle of the opening plane is equal to the maximum positive pitch angle and the opening plane is parallel to the first plane.

In certain embodiments of the method, determining the shape and the size of the oil pick-up tube and of the opening in the oil pick-up tube includes locating the peripheral edge at a first positive distance from the first plane, at a second positive distance from the second plane, and at a third positive distance from the oil reservoir bottom.

In certain embodiments, the method further includes selecting a maximum positive roll angle of a third plane of an upper surface of the selected amount of oil in the oil reservoir; and selecting a minimum negative roll angle of a fourth plane of the upper surface of the selected amount of oil in the oil reservoir; and determining the shape and the size of the oil pick-up tube and of the opening in the oil pick-up tube includes determining the shape and the size of the oil pick-up tube and of the opening in the oil pick-up tube to locate the opening below the first plane at the maximum positive pitch angle, below the second plane at the minimum negative pitch angle, below the third plane at the maximum positive roll angle, and below the fourth plane at the minimum negative roll angle.

In certain embodiments of the method, the oil reservoir bottom defines a reservoir bottom plane, and wherein determining the shape and the size of the oil pick-up tube and of the opening in the oil pick-up tube includes locating a bottom-most portion of the peripheral edge in a bottom plane parallel to the reservoir bottom plane.

In certain embodiments of the method, the maximum positive pitch angle of the first plane of the upper surface of the selected amount of oil in the oil reservoir is selected based on inertial forces during a maximum acceleration and/or based on gravity forces when the vehicle is located on an incline; and the minimum negative pitch angle of the second plane of the upper surface of the selected amount of oil in the oil reservoir is selected based on inertial forces during a maximum deceleration and/or based on gravity forces when the vehicle is located on a decline.

In certain embodiments of the method, the minimum negative pitch angle of the second plane of the upper surface of the selected amount of oil in the oil reservoir is selected based on inertial forces during a maximum acceleration and/or based on gravity forces when the vehicle is located on an incline; and the maximum positive pitch angle of the first plane of the upper surface of the selected amount of oil in the oil reservoir is selected based on inertial forces during a maximum deceleration and/or based on gravity forces when the vehicle is located on a decline.

In certain embodiments of the method, the shape of the oil pick-up tube is Y-shaped and includes a main tube portion configured to extend to an oil pump, a first leg portion configured to extend downward toward an oil reservoir bottom and which terminates at the opening, and a second leg portion configured to extend upward away from the oil reservoir bottom and to a closed end.

In certain embodiments, the method further includes locating a screen in the oil pick-up tube, wherein the screen extends from the closed end of the second leg portion to the main tube portion.

In another embodiment, an oil intake system for a vehicle is provided and includes an oil reservoir having an internal volume with an internal shape including an oil reservoir bottom, wherein the oil reservoir has: a theoretical maximum positive pitch angle of a first plane of an upper surface of a selected amount of oil in the oil reservoir: a theoretical minimum negative pitch angle of a second plane of the upper surface of the selected amount of oil in the oil reservoir; and a theoretical bottom plane at a selected positive distance above the oil reservoir bottom; and an oil pick-up tube received in the oil reservoir, wherein the oil pick-up tube has a distal end formed with an opening, wherein the opening is located below the first plane at the theoretical maximum positive pitch angle and below the second plane at the theoretical minimum negative pitch angle, wherein the opening is defined by a peripheral edge of the oil pick-up tube, wherein the peripheral edge lies substantially within an opening plane, wherein the opening plane has a positive pitch angle of at least half of the theoretical maximum positive pitch angle.

In certain embodiments of the oil intake system, the positive pitch angle of the opening plane is from at least half of the theoretical maximum positive pitch angle to the theoretical maximum positive pitch angle.

In certain embodiments of the oil intake system, the positive pitch angle of the opening plane is equal to the theoretical maximum positive pitch angle and the opening plane is parallel to the first plane.

In certain embodiments of the oil intake system, the peripheral edge is a first positive distance from the first plane, a second positive distance from the second plane, and a third positive distance from the oil reservoir bottom.

In certain embodiments of the oil intake system, the oil reservoir has a theoretical maximum positive roll angle of a third plane of the upper surface of the selected amount of oil in the oil reservoir: the oil reservoir has a theoretical minimum negative roll angle of a fourth plane of the upper surface of the selected amount of oil in the oil reservoir; and the opening is located below the first plane at the theoretical maximum positive pitch angle, below the second plane at the theoretical minimum negative pitch angle, below the third plane at the theoretical maximum positive roll angle, and below the fourth plane at the theoretical minimum negative roll angle.

In certain embodiments of the oil intake system, the oil reservoir bottom defines a reservoir bottom plane; and a bottom-most portion of the peripheral edge is located in a bottom plane parallel to the reservoir bottom plane.

In certain embodiments of the oil intake system, the oil pick-up tube is Y-shaped and includes a main tube portion configured to extend to an oil pump, a first leg portion configured to extend downward toward an oil reservoir bottom and which terminates at the distal end and opening, and a second leg portion configured to extend upward away from the oil reservoir bottom and to a closed end.

In certain embodiments, the oil intake system further includes a screen located in the oil pick-up tube and extending from the closed end of the second leg portion to the main tube portion.

In another embodiment, a vehicle is provided and includes an engine: a reservoir configured to hold a hydraulic fluid: a pump: a tube configured to deliver the hydraulic fluid from the reservoir to the pump, wherein the tube has a distal end formed with an opening and received within the reservoir, wherein the opening is defined by a peripheral edge of the tube, wherein the peripheral edge lies substantially within an opening plane, wherein the opening plane has a positive pitch angle, and wherein the tube defines a hydraulic fluid flow direction; and a mesh screen located in the tube substantially perpendicular to the hydraulic fluid flow direction.

In certain embodiments of the vehicle, the reservoir is configured to hold at last a minimum amount of hydraulic fluid; the minimum amount of hydraulic fluid has an upper surface with a selected theoretical maximum positive pitch angle and a selected theoretical minimum negative pitch angle; and the positive pitch angle of the opening plane is from half of the selected theoretical maximum positive pitch angle to the selected theoretical maximum positive pitch angle.

DESCRIPTION OF THE DRAWINGS

The present disclosure will hereinafter be described in conjunction with the following drawing figures, wherein like numerals denote like elements, and wherein.

DETAILED DESCRIPTION

Figure 1:
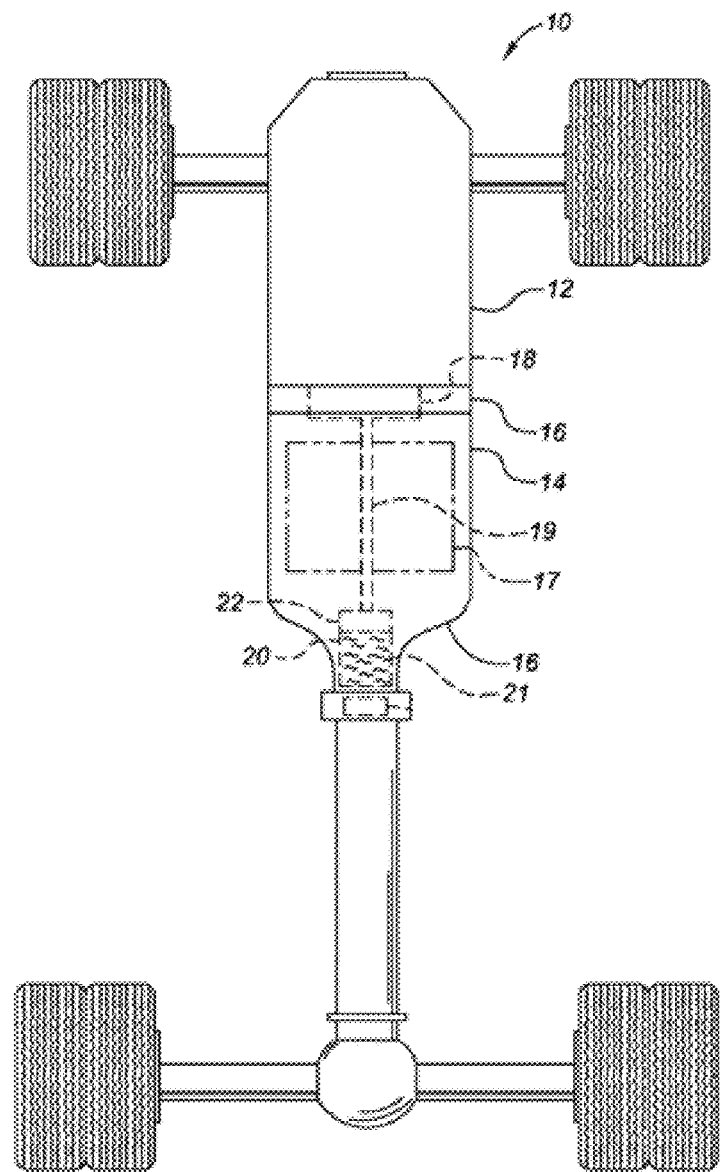
FIG. 1 is a schematic view of a vehicle having a pump assembly and fluid reservoir in accordance with exemplary embodiments of the present disclosure.

The following detailed description is merely exemplary in nature and is not intended to limit the application and uses of embodiments herein. Furthermore, there is no intention to be bound by any expressed or implied theory presented in the preceding introduction and brief summary or the following detailed description. As used herein, the term "module" refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

Finally, for the sake of brevity, conventional techniques and components related to vehicle mechanical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention. It should also be understood that the figures are merely illustrative and may not be drawn to scale.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Referring to the drawings, wherein like reference numbers correspond to the same or similar components throughout the several views, there is shown in FIG. 1 a schematic representation of a vehicle 10 having an engine 12 and a transmission 14. Embodiments will be described herein with respect to the vehicle 10 as an exemplary application. As such, it should be readily understood that FIG. 1 is merely an exemplary application by which the present embodiments may be incorporated and practiced—i.e., the subject matter is not limited to the particular configuration of FIG. 1.

The vehicle 10 may be any one of a number of different types of vehicles, such as, for example, a sedan, a wagon, a truck, or a sport utility vehicle (SUV), and may be two-wheel drive (2WD), four-wheel drive (4WD), or all-wheel drive (AWD). In various embodiments, the vehicle 110 may incorporate any one of, or combination of, a number of different types of engines, such as, for example, gasoline or diesel fueled combustion engines, flex fuel vehicle (FFV) engines (i.e., using a mixture of gasoline and alcohol), hybrid vehicles, electric vehicle drive units (EV DUs) and transmissions.

The engine 12 is selectively fluidly connectable to the transmission 14 through a hydrokinetic power coupling device, such as torque converter 16. Alternatively, the engine 12 is selectively mechanically connectable to the transmission 14 through a torque transmitting mechanism, preferably by way of a lockup clutch, shown in phantom in FIG. 1 as 18. In other words, the lockup clutch 18 may be selectively engaged under certain conditions to provide a direct mechanical coupling between the engine 12 and transmission input shaft 19, effectively bypassing the torque converter 16. The transmission 14 includes a plurality of differential gear sets (e.g., planetary gear sets) and clutch packs, collectively depicted in phantom as 17 in FIG. 1, to achieve the necessary transmission of power between the engine 12 and a rotatable output member, such as the driveshaft or transmission output shaft 24.

The transmission 14 also includes or is in fluid communication with a single internal reservoir or sump volume, shown hidden in FIG. 1 at 20, or multiple reservoirs (not shown). The reservoir 20 stores and supplies hydraulic fluid 21, such as oil, which is pressurized and fed to the transmission 14 and/or engine 12 by a pump assembly 22. Although depicted in FIG. 1 as being packaged inside the transmission housing, the reservoir 20 and pump assembly 22 may be packaged at locations outside of the transmission 14.

Figure 2:
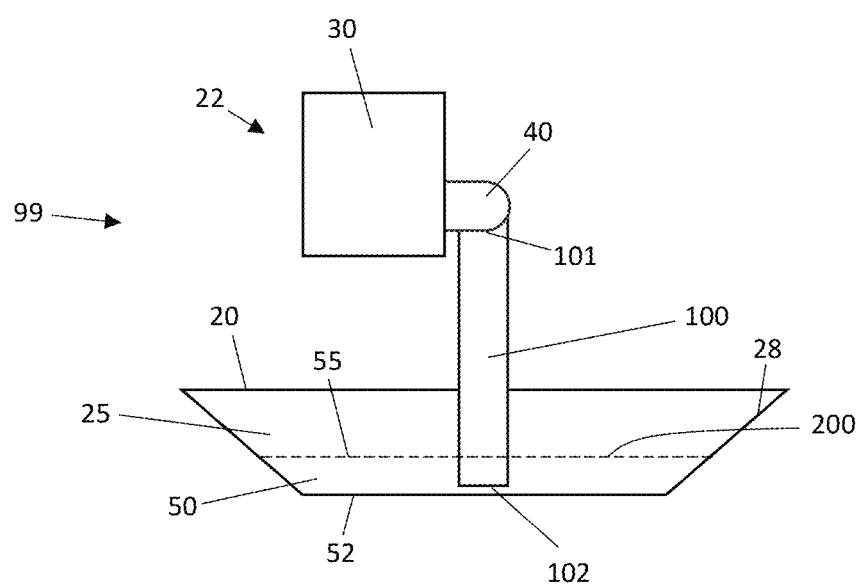
FIG. 2 is a schematic view of a fluid intake system in accordance with exemplary embodiments of the present disclosure.
Figure 3:
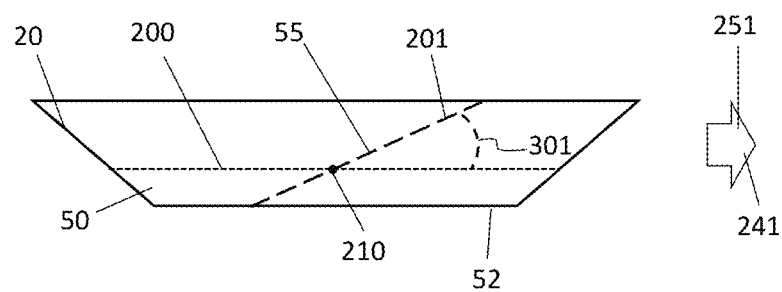
FIGS. 3-6 are schematic views of the fluid within a reservoir during inertial changes according to embodiments of the present disclosure.

Referring now to FIG. 2, a schematic of an intake system 99 is provided. As shown, the intake system 99 includes a pump assembly 22 and a fluid reservoir 20. FIG. 2 only illustrates the interconnection of components and does not illustrate the shapes of components as is contemplated herein.

As shown, the fluid reservoir 20 holds a hydraulic fluid 50. Hydraulic fluid 50 has an upper surface 55. In FIG. 2, the vehicle is stationary and is supported by a horizontal surface, thus the upper surface 55 of the hydraulic fluid 50 lies in the horizontal plane 200.

In certain embodiments, the fluid reservoir 20 is an oil reservoir, such as an oil pan or oil tank, and the hydraulic fluid 50 is oil. While the fluid reservoir 20 may have any suitable and desired shape, fluid reservoir 20 includes a reservoir bottom 52 or tank bottom 52. Further, the reservoir 20 defines an internal volume 25 with an internal shape 28 including the bottom 52.

As shown, the pump assembly includes a pump 30, an intake 40, and a pick-up tube 100. The pick-up tube 100 has a proximal or first end 101 in fluid connection with the intake 40. Further, the pick-up tube 100 has a distal or second end 102 located in the fluid reservoir 20 and in fluid connection with the hydraulic fluid 50 therein.

FIGS. 3-6 illustrate movement of the hydraulic fluid 50 within the reservoir 20 during normal vehicle operation. For example, in FIG. 3, the vehicle traveling in the direction of arrow 241 accelerates and the hydraulic fluid 50 moves opposite to arrow 241, relative to the reservoir 20, under the influence of inertial forces indicated by arrow 251. As a result, the surface 55 of the hydraulic fluid 50 is located in a plane 201, i.e., an acceleration slosh plane. As shown, plane 201 intersects the horizontal plane 200 at a pitch axis 210. Further, the plane 201 and horizontal plane 200 intersect at a positive pitch angle 301.

Figure 4:
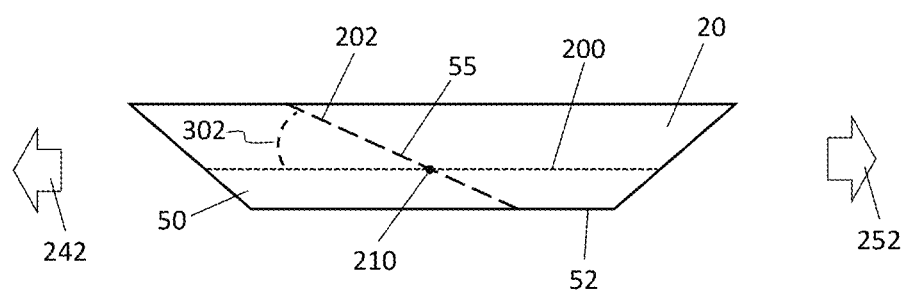

In FIG. 4, the vehicle traveling in the direction of arrow 242 decelerates and the hydraulic fluid 50 moves in the same direction as arrow 242, relative to the reservoir 20, under the influence of inertial forces indicated by arrow 252. As a result, the surface 55 of the hydraulic fluid 50 is located in a plane 202 i.e., a deceleration slosh plane. As shown, plane 202 intersects the horizontal plane 200 at a pitch axis 210. Further, the plane 202 and horizontal plane 200 intersect at a negative pitch angle 302.

Figure 5:
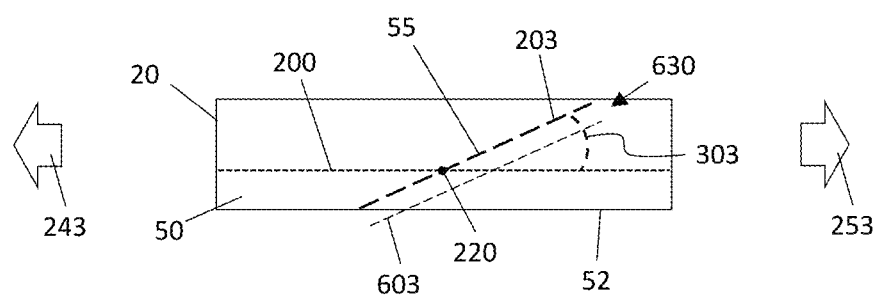

In FIG. 5, the vehicle is traveling forward in a direction into the plane of the drawing sheet, and makes a lefthand turn in the direction of arrow 243. The hydraulic fluid 50 moves in the opposite direction, relative to the reservoir 20, under the influence of inertial forces indicated by arrow 253. As a result, the surface 55 of the hydraulic fluid 50 is located in a plane 203. As shown, plane 203 intersects the horizontal plane 200 at a roll axis 220. Further, the plane 203 and horizontal plane 200 intersect at a positive roll angle 303.

Figure 6:
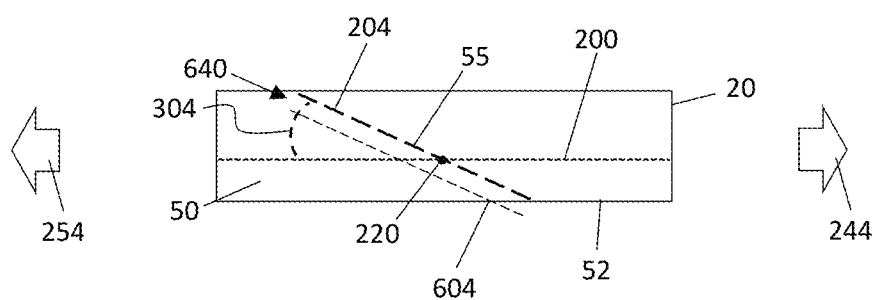

In FIG. 6, the vehicle is traveling forward in a direction into the plane of the drawing sheet, and makes a righthand turn in the direction of arrow 244. The hydraulic fluid 50 moves in the opposite direction, relative to the reservoir 20, under the influence of inertial forces indicated by arrow 254. As a result, the surface 55 of the hydraulic fluid 50 is located in a plane 204. As shown, plane 204 intersects the horizontal plane 200 at a roll axis 220. Further, the plane 204 and horizontal plane 200 intersect at a negative roll angle 304.

While movement of the fluid 50 within the reservoir 20 is described in FIGS. 3-6 relative to inertial forces, the fluid 50 may also move under the forces of gravity. For example, the vehicle may be parked or driven over non-level surfaces. Likewise, the movement of the fluid 50 within the reservoir 20 may result from a combination of inertial and gravity forces. For example, in FIG. 3, a vehicle traveling in the direction of arrow 241 that accelerates while traveling uphill would result in movement of the hydraulic fluid 50, under the influence of gravity and inertial forces indicated by arrow 251, to a plane 201. The maximum acceleration slosh plane 201 results from a combination of acceleration while traveling uphill. Likewise, in FIG. 4, a vehicle traveling in the direction of arrow 241 that decelerates while traveling downhill would result in movement of the hydraulic fluid 50, under the influence of gravity and inertial forces indicated by arrow 252, to a plane 202. The maximum deceleration slosh plan 202 results from a combination of deceleration while traveling downhill.

Figure 7:
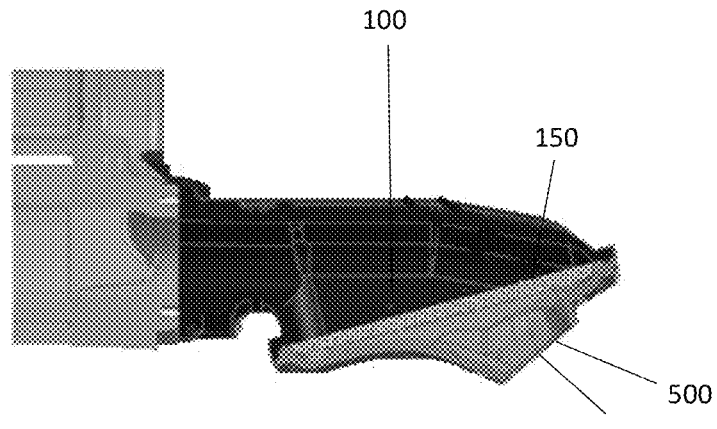
FIG. 7 is a perspective view of a portion of an exemplary pick-up tube according to embodiments of the present disclosure.
Figure 8:
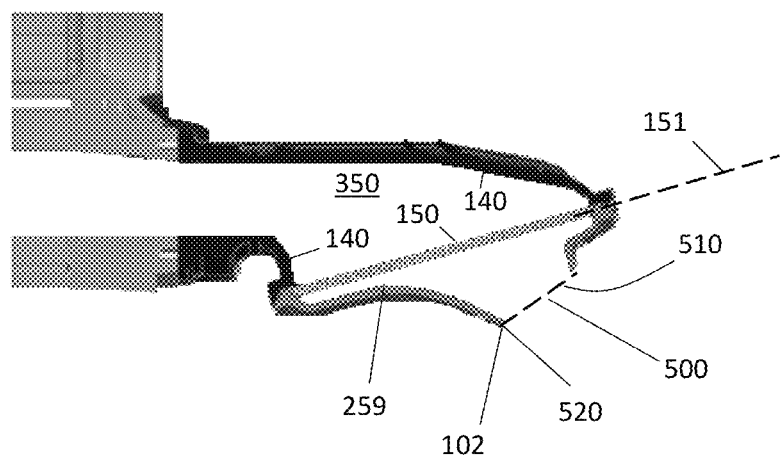
FIG. 8 is a cross-sectional view of the pick-up tube of FIG. 7 according to embodiments of the present disclosure.

Referring now to FIGS. 7 and 8, a distal end 102 of a pick-up tube 100 is illustrated. As shown, the distal end 102 is formed with an opening 500. The opening 500 is defined by a peripheral edge 520. The peripheral edge 520 defines and lies substantially within an opening plane 510. For example, at least 50% of the peripheral edge 520 lies within the opening plane 510, such as at least 55%, at least 60%, at least 65%, at least 70%, at least 75% at last 80%, at least 85%, at least 90%, or at least 95%, of the peripheral edge 520 lies within the opening plane 510. The opening plane 510 may be considered to have a thickness in a perpendicular direction to the plane 510 of less than 8 millimeters (mm), such as less than 6 mm, less than 4 mm, less than 2 mm, less than 1.5 mm, less than 1 mm, or less than 0.5 mm. Alternatively, the opening plane 510 may be considered to have a thickness in a perpendicular direction to the plane 510 of less than 25% of the maximum inner dimension of the opening 500, such as less than 20%, less than 15%, less than 10% or less than 5% of the maximum inner dimension of the opening 500.

The opening 500 is in fluid communication with an internal channel 350 defined by inner surfaces of walls 140 of the pick-up tube 100. As shown, a mesh screen 150 is located within the internal channel 350. Specifically, the mesh screen 150 extends across the internal channel 350 and contacts the inner surfaces of walls 140. The mesh screen 150 may be mounted to the walls 140.

Figure 9:
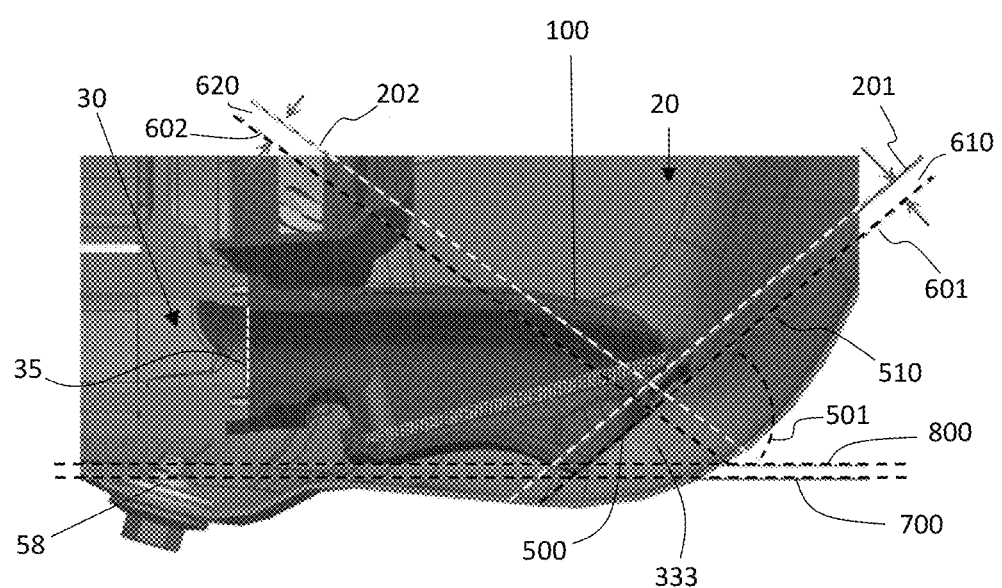
FIG. 9 is a perspective view of an exemplary pick-up tube located in a portion of a reservoir according to embodiments of the present disclosure.
Figure 10:
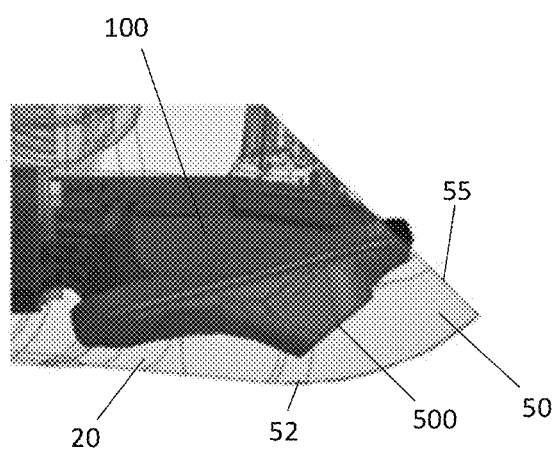
FIGS. 10-13 are perspective views of the pick-up tube and reservoir of FIG. 9 during inertial changes according to embodiments of the present disclosure.
Figure 11:
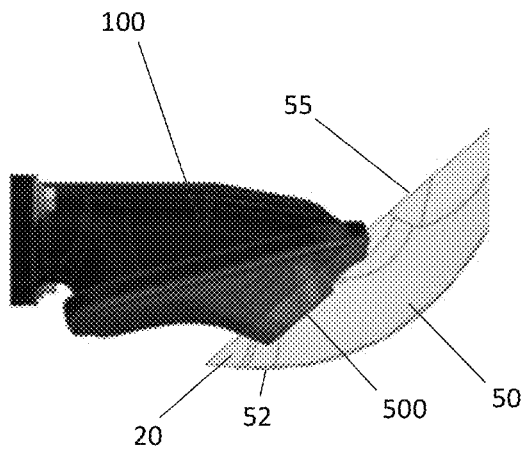

FIG. 9 illustrates the position of the pick-up tube 100, and specifically of the opening 500, in reservoir 20. FIG. 9 is a side cross-sectional view of the reservoir 20 and illustrates planes 201 and 202. In exemplary embodiments, the opening 500 of the pick-up tube 100 is located below the plans 201 and 202 (and below planes 203 and 204).

Further in certain embodiments, an offset is provided for each plane to ensure that the opening 500 remain submerged within the fluid 50 during vehicle operation. For example, an offset plane 601 is parallel to plane 201 and is located at a perpendicular distance 610 below plane 201. Likewise, an offset plane 602 is parallel to plane 202 and is located at a perpendicular distance 620 below plane 202. Similar offset planes 603 and 604 are provided at respective perpendicular distances 630 and 640 from planes 203 and 204 (as shown in FIGS. 5 and 6).

As shown in FIG. 8, the inner surfaces of walls 140 of the pick-up tube 100 form a curved short side turn 259 to turn flow towards the pump and delay onset of flow separation.

FIG. 9 also identifies a frozen water plane 700. The frozen water plane 700 indicates the height over the reservoir bottom 52 at which water may freeze during periods that the vehicle is located in freezing temperature conditions while not running. To ensure proper operation of the vehicle when starting during such freezing conditions, the opening 500 may be located above the frozen water plane 700. However, embodiments herein provide for proper operation of the vehicle even when the water plane 700 is higher than the bottom edge of the opening 500 as fluid 50 may enter the opening 500 above the water plane 700.

FIG. 9 also illustrates that the reservoir 20 includes a drain 58. A horizontal drain plane 800 is defined by the drain 58. To ensure proper draining of the reservoir 20, such as during an oil change, the opening 500 should be located above the drain plane 800. However, embodiments herein provide for proper draining even when the drain plane 800 is higher than the bottom edge of the opening 500. It is further noted that while FIG. 9 illustrates drain plane 800 being higher than water plane 700, other embodiments where water plane 700 is higher than drain plane 800 are envisioned. Further, planes 700 and 800 may be co-planar.

Thus, a volume 333, having a four-sided pyramidal shape, is identified and located below offset planes 601, 602, 603, 604. In exemplary embodiments, the opening 500 is located within the volume 333.

Further, in exemplary embodiments, the functionality of the opening 500 is improved by providing the opening 500 with an opening plane 510 with a positive pitch angle 501 of at least half of the pitch angle 301. As a result, the opening 500 may extend from the intersection of plane 601 and a selected minimum distance from the tank bottom to a midpoint location on plane 602. In exemplary embodiments, the opening 500 has an opening plane 510 with a positive pitch angle 501 equal to the pitch angle 301. As a result, the opening 500 may extend from the intersection of plane 601 and the minimum distance from the reservoir bottom 52 to the intersection of planes 601 and 602. In such an embodiment, the opening plane 510 is co-planar with plane 601. Thus, embodiments herein provide for an opening 500 having a pitch angle 501 of from at least half of the pitch angle 301 to the pitch angle 301. While the opening 500 is illustrated as extending the entire distance across volume 333, it is contemplated that in certain embodiments, the opening 500) may not extend the entire distance across volume 333.

In exemplary embodiments, the pitch angle 501 is no more than 45 degrees, such as no more than 44 degrees, no more than 43 degrees, no more than 42 degrees, no more than 41 degrees, no more than 40 degrees, no more than 39 degrees, no more than 38 degrees, no more than 37 degrees, no more than 36 degrees, no more than 35 degrees, no more than 34 degrees, no more than 33 degrees, no more than 32 degrees, no more than 31 degrees, no more than 30 degrees, no more than 29 degrees, no more than 28 degrees, no more than 27 degrees, no more than 26 degrees, no more than 25 degrees, no more than 24 degrees, no more than 23 degrees, no more than 22 degrees, no more than 21 degrees, or no more than 20 degrees.

In exemplary embodiments, the pitch angle 501 is at least 15 degrees, such as at least 16 degrees, at least 17 degrees, at least 18 degrees, at least 19 degrees, at least 20 degrees, at least 21 degrees, at least 22 degrees, at least 23 degrees, at least 24 degrees, at least 25 degrees, at least 26 degrees, at least 27 degrees, at least 28 degrees, at least 29 degrees, at least 30 degrees, at least 31 degrees, at least 32 degrees, at least 33 degrees, at least 34 degrees, at least 35 degrees, at least 36 degrees, at least 37 degrees, at least 38 degrees, at least 39 degrees, or at least 40 degrees.

FIG. 9 also illustrates that the pick-up tube 100 extends from the 500 in the volume 333 to an interface 35 with the pump 30, such that an internal fluid pathway is formed through the pick up tube 100 and pump 30. Embodiments herein provide for maximizing the size of the opening 500 of the pick up tube 100 as a primary goal. A secondary goal is to provide a pick up tube inlet flow direction through the opening 500 that is aligned with the pick up tube outlet flow direction into the pump 30, i.e., perpendicular to the interface 35 in FIG. 9. In exemplary embodiments, the pick up tube inlet flow direction is less than 90 degrees from the pick up tube outlet flow direction, such as less than 80 degrees, less than 70 degrees, less than 60 degrees, less than 50 degrees, less than 45 degrees, less than 40 degrees, less than 30 degrees, less than 20 degrees, or less than 10 degrees from the pick up tube outlet flow direction.

FIGS. 10-13 illustrate that the opening 500 of the pick-up tube 100 remains submerged under the surface 55 of the hydraulic fluid 50 during a selected maximum acceleration, maximum deceleration, maximum lefthand turn, and maximum righthand turn, respectively.

Figure 12:
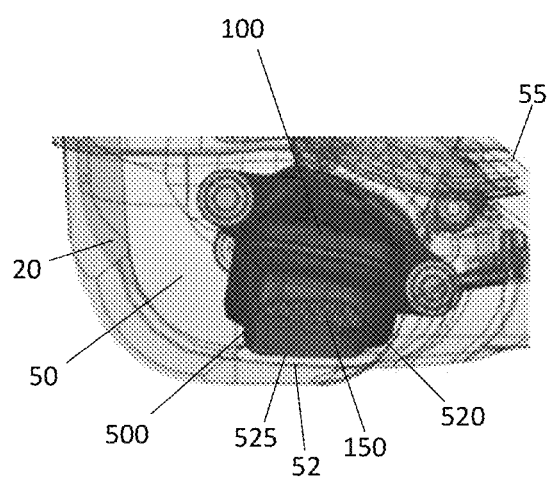
Figure 13:
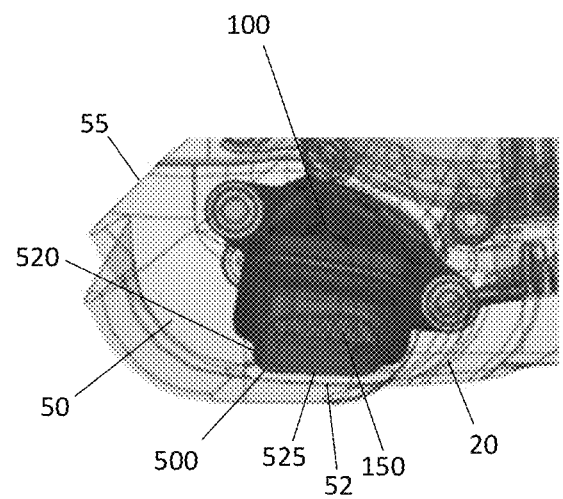

As shown in FIGS. 12-13, the bottom portion 525 of the peripheral edge 520 of opening 500 is substantially flat and lies within a plane parallel to the bottom 52 of the reservoir 20.

Figure 14:
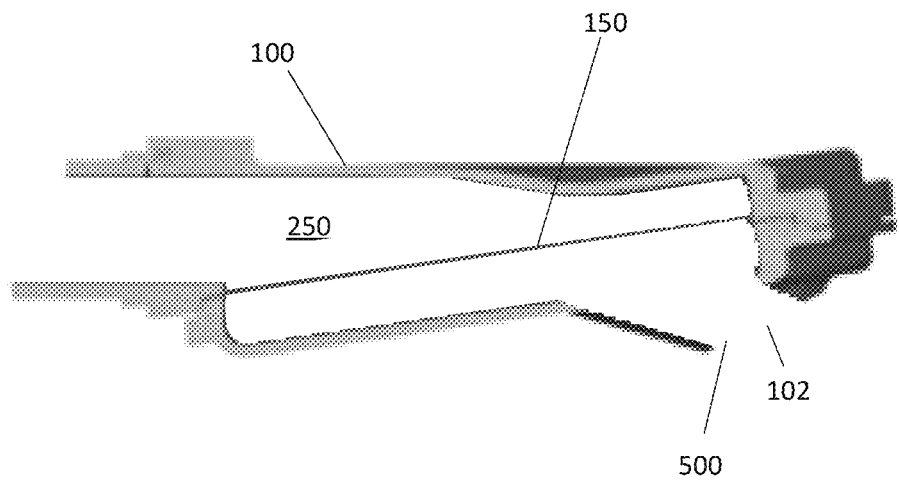
FIG. 14 is a cross-sectional view of a portion of an exemplary pick-up tube according to embodiments of the present disclosure.
Figure 15:
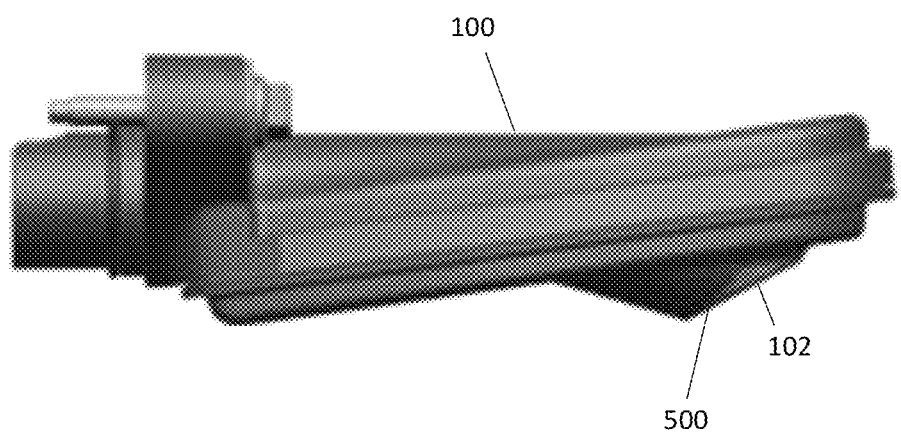
FIG. 15 is a perspective view of the pick-up tube of FIG. 14 according to embodiments of the present disclosure.

FIGS. 14 and 15 illustrate an embodiment of a pick-up tube 100. As shown, the pick-up tube 100 has an internal channel 250 with an opening 500 at the distal end 102. As shown in FIG. 14, a mesh screen 150 extends across the channel 250. The opening 500 is formed at a desired pitch angle to the horizontal plane.

Figure 16:
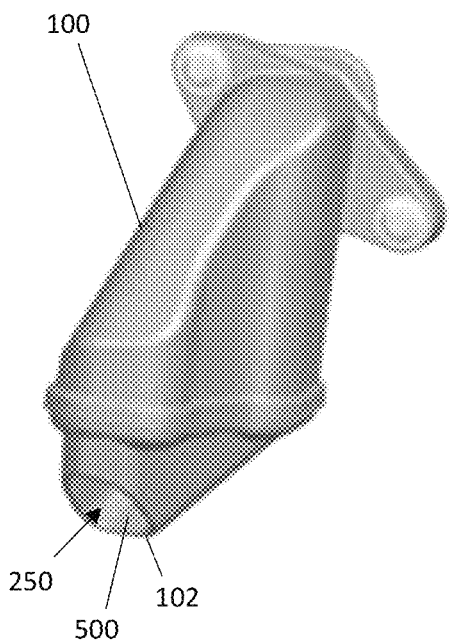
FIG. 16 is a cross-sectional view of a portion of an exemplary pick-up tube according to embodiments of the present disclosure.
Figure 17:
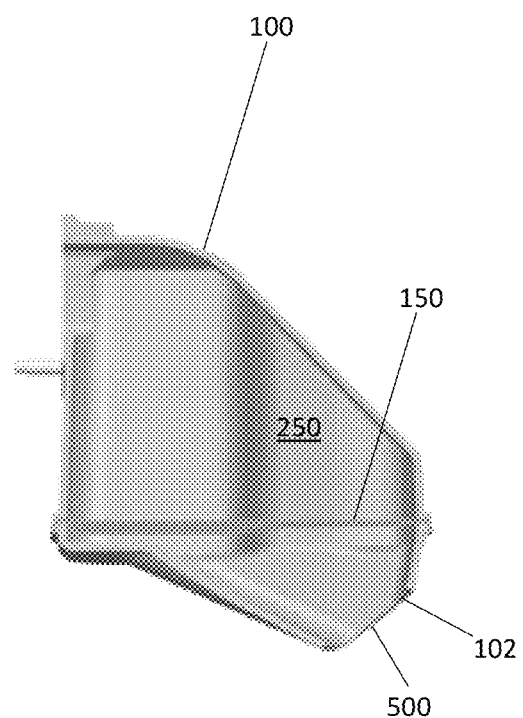
FIG. 17 is a perspective view of the pick-up tube of FIG. 16 according to embodiments of the present disclosure.

FIGS. 16 and 17 illustrate another embodiment of a pick-up tube 100. As shown, the pick-up tube 100 has an internal channel 250 with an opening 500 at the distal end 102. As shown in FIG. 17, a mesh screen 150 extends across the channel 250. The opening 500 is formed at a desired pitch angle to the horizontal plane.

Figure 18:
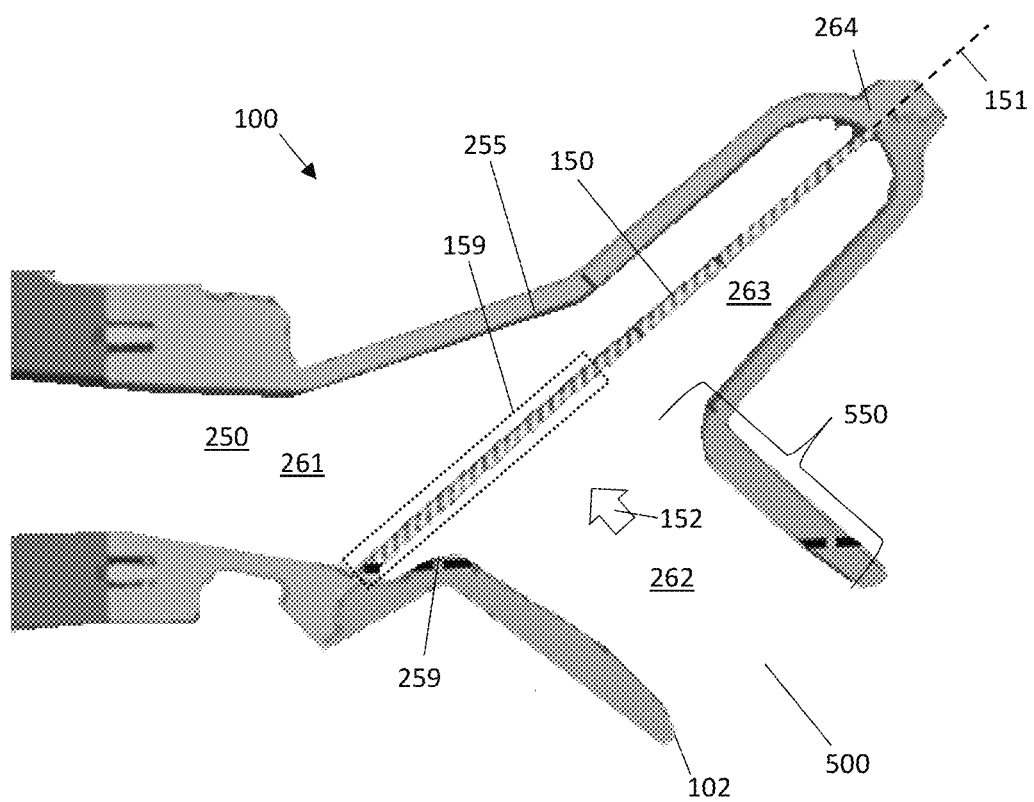
FIG. 18 is a cross-sectional view of a portion of an exemplary pick-up tube according to embodiments of the present disclosure.

FIG. 18 illustrates another embodiment of a pick-up tube 100. In FIG. 18, the oil pick-up tube is Y-shaped and includes a main tube portion 261 configured to extend to an oil pump, a first leg portion 262 configured to extend downward toward an oil tank bottom and which terminates at the distal end 102 and opening 500, and a second leg portion 263 configured to extend upward away from the oil tank bottom and to a closed end 264. As shown, a mesh screen 150 is located in the pick-up tube 100 and extends from the closed end 264 of the second leg portion 263 to the main tube portion 261.

The mesh screen 150 defines a plane 151 that is perpendicular to a flow direction, indicated by arrow 152, of fluid entering the pick-up tube 100 through the first leg portion 262. Further, the internal channel 250 is formed with an angled wall 255 for turning the flow vector toward the pump. Also, internal channel 250 is formed with a curved short side turn 259 to turn flow towards the pump and delay onset of flow separation.

During operation in freezing temperatures, ice may build up in the mesh screen 150 in the region 159. The embodiment of FIG. 18 provides for flow fluid around the ice in region 159 by flowing through the second leg portion 263 to the main tube portion 261. Thus, the screen 150 and second leg portion 263 may be sized for cold flow of the fluid.

As described in FIGS. 1-18, an oil intake system 99 is provided with a pick-up tube 100 that improves function while remaining operable in all expected conditions.

The opening plane 510 has been described as being parallel to the plane 201, and plane 201 has been described as an acceleration slosh plane. This arrangement is particularly useful when the pump is mounted to the rear of the pick-up tube. In certain embodiments, opening plane 510 is parallel to the plane 201, and plane 201 is the acceleration slosh plane. This arrangement may be useful when the pump is mounted forward of the pick-up tube.

In exemplary embodiments, a perpendicular direction (such as arrow 152) to the opening plane 510 is pointed at the pump intake 40.

In exemplary embodiments, the opening plane 510 is not substantially parallel to bottom 52 of the reservoir 20 near the point of entry into the opening 500.

In exemplary embodiments, the opening plane 510 is offset from rear and forward oil slosh planes 201 and 202 to prevent pulling air through the fluid surface 55.

In exemplary embodiments, the shape of the opening 500 is an oval or is D-shaped. For a D-shaped opening 500, the bottom portion 525 of the peripheral edge 520 is predominantly flat and parallel to the tank bottom 52 at the location vertically below the bottom portion 525 of the peripheral edge 520.

In exemplary embodiments, the mesh screen is predominantly perpendicular to the main flow direction 252 of the fluid 50 entering the pick-up tube 100. Such an arrangement may drastically lower fluid pressure drop through the pick-up tube 100. Even for the same pressure drop, a smaller amount of air coming out of solution is a benefit when considering pump metrics. For example, there is a lower chance of self-pump regulation, less aeration into the pump rotor, and better maximum high flow capacity. Further, the screen location enables an exemplary embodiment with respect to the flow geometry immediately downstream of the pickup tube inlet plane.

In exemplary embodiments, the mesh screen 150 extends to the curved convex inside surface of the closed end 264. This may be referred to as the suction or low pressure side of the pick-up diffuser section 550, and is where flow separation may first occur. The diffuser shape is maintained along this section with no disruption by the geometry of the mesh screen 150.

The diffuser section 550 increases in area along the flow direction. Often, the diffuser section 550 is conical, though other shapes may be suitable. The diffuser section 550 slows the fluid flow rate in a controlled manner, such that fluid flow does not separate from the wall.

In exemplary embodiments, the mesh screen 150 is extended above the main diffuser shape of the pickup inlet opening 500.

In exemplary embodiments, the diffuser shape of pickup entry is continued downstream of mesh screen area.

In exemplary embodiments, the width around the top of mesh screen 150 near the closed end 264 is constant and the inner surfaces of the channel are predominantly parallel to the mesh screen 150. The distance from the inner surfaces of the channel to the mesh screen 150 is provided to keep less than a selected flow rate of fluid at a cold start condition with full blockage of part of screen within main flow path, such as with ice.

Exemplary embodiments herein provide for a reduced pressure drop and better fluid flow as compared to conventional pick-up tubes.

Exemplary embodiments have an increased length of diffuser section due to the mesh screen layout. As a result, less air comes out of solution within the pick-up tube 100 due to lower flow separation. This is realized as maximum pump flow and for continuously variable vane pumps, results in lower slide torque. Higher slide torque is a negative for pump self-regulation.

Embodiments herein provide for better performance in conditions of high ice/water levels during cold starts. The design herein allows the water level to come up to and above the bottom of the inlet opening without starving the pump. Specifically, the remaining portion of the inlet opening extends over the ice/water level. For a typical pick-up, when the water level reaches the opening, the water will start starving the pump. A traditional pick-up requires some offset from the water/ice line. In contrast, the layout described herein, due to the more upright inlet opening plane, allows the fluid to keep flowing even when the water/ice level is above the bottom of the inlet opening.

Embodiments herein allow the reservoir to fully drain during fluid change. The upright inlet opening allows the inlet opening to overlap the bottom oil drain line, yet still allow the pump to drain. With a traditional pick-up, once the pickup inlet is under oil, the pump and galleries will not drain.

Embodiments herein allow for the drain plug nut to be located at a higher location relative to the bottom of the reservoir and still allow the reservoir and pump to fully drain.

In view of the structure described in relation to FIGS. 1-18, a method is described for manufacturing an oil intake system for a vehicle. The method includes providing an oil tank having an internal volume with an internal shape including an oil tank bottom. Further, the method includes determining a selected amount of fluid, such as oil, received in the oil tank. In certain embodiments, the selected amount of fluid is a minimum amount for safe operation of the vehicle.

The method may include selecting a maximum positive pitch angle of a first plane of an upper surface of the selected amount of oil in the oil tank. For example, the maximum positive pitch angle may be the angle between the horizontal plane and the plane of the upper surface of the fluid during a deceleration or acceleration event.

The method may include selecting a minimum negative pitch angle of a second plane of the upper surface of the selected amount of oil in the oil tank. For example, the minimum negative pitch angle may be the angle between the horizontal plane and the plane of the upper surface of the fluid during an acceleration or deceleration event.

The method may further include determining a bottom plane at a selected positive distance above the oil tank bottom. For example, a minimum vertical distance for fluid flow may be determined.

The method may further include determining a shape and a size of an oil pick-up tube and of an opening in the oil pick-up tube to locate the opening below the first plane at the maximum positive pitch angle and below the second plane at the minimum negative pitch angle, wherein the opening is defined by a peripheral edge of the oil pick-up tube, wherein the peripheral edge lies substantially within an opening plane, wherein the opening plane has a positive pitch angle of at least half of the maximum positive pitch angle. Also, the method may include fabricating the oil pick-up tube with the shape, the size, and the opening.

In certain embodiments, determining the shape and the size of the oil pick-up tube and of the opening in the oil pick-up tube includes locating the peripheral edge at a first positive distance from the first plane, at a second positive distance from the second plane, and at a third positive distance from the oil tank bottom.

In certain embodiments, the method further includes selecting a maximum positive roll angle of a third plane of an upper surface of the selected amount of oil in the oil tank; and selecting a minimum negative roll angle of a fourth plane of the upper surface of the selected amount of oil in the oil tank. In such methods, determining the shape and the size of the oil pick-up tube and of the opening in the oil pick-up tube may include determining the shape and the size of the oil pick-up tube and of the opening in the oil pick-up tube to locate the opening below the first plane at the maximum positive pitch angle, below the second plane at the minimum negative pitch angle, below the third plane at the maximum positive roll angle, and below the fourth plane at the minimum negative roll angle.

In certain embodiments, the oil tank bottom defines a tank bottom plane, and determining the shape and the size of the oil pick-up tube and of the opening in the oil pick-up tube includes locating a bottom-most portion of the peripheral edge in a bottom plane parallel to the tank bottom plane.

It is noted that an opening 500 may be formed such that the opening plane 510 is co-planar with the offset plane 601, such that the opening plane 510 is formed at an angle 501 equal to the pitch angle 301 of the slosh plane 201 (and offset plane 601). In such an embodiment, the opening 500 may have a bottom at the intersection of the offset plane 601 and the upper plane of the planes 700 and 800. In such an embodiment, the opening 500 may have a top at the intersection of the offset plane 601 and the offset plane 602.

It is envisioned that the opening 500 may be formed such that the opening plane 510 has a pitch angle 501 less than the pitch angle 301 of the slosh plane 201 (and offset plane 601), while the opening 500 remains in the volume 333. For example, the top end of the opening 500 may be moved along the offset plane 602 away from the offset plane 601. Thus, the angle 501 of the opening plane 510 is reduced. In certain embodiments, the angle 501 of the opening plane 500 is less than 100% of the angle 301 of the offset plane 601, such as less than 90%, less than 80%, less than 70%, less than 60%, less than 50%, less than 45%, less than 40%, or less than 33%, of the angle 301 of the offset plane 601. In certain embodiments, the angle 501 of the opening plane 500 is at least 30% of the angle 301 of the offset plane 601, such as at least 33%, such as at least 40%, at least 45%, at least 50%, at least 60%, at least 70%, at least 80%, or at least 90%, of the angle 301 of the offset plane 601.

Further, it is envisioned that the opening 500 may be formed such that the opening plane 510 has a pitch angle 501 greater than the pitch angle 301 of the slosh plane 201 (and offset plane 601), while the opening 500 remains in the volume 333. For example, the bottom end of the opening 500 may be moved along the higher plane of the planes 700 and 800 away from the offset plane 601. Thus, the angle 501 of the opening plane 510 is increased. In certain embodiments, the angle 501 of the opening plane 500 is greater than 100% of the angle 301 of the offset plane 601, such as greater than 105%, greater than 110%, or greater than 115%, of the angle 301 of the offset plane 601. In certain embodiments, the angle 501 of the opening plane 500 is less than 120% of the angle 301 of the offset plane 601, such as less than 115%, less than 110%, or less than 105%, of the angle 301 of the offset plane 601.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing summary and detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for manufacturing an oil intake system for a vehicle, the method comprising:
    providing an oil reservoir having an internal volume with an internal shape including an oil reservoir bottom;
    determining a selected amount of oil received in the oil reservoir;
    selecting a theoretical maximum positive pitch angle of a first plane of an upper surface of the selected amount of oil in the oil reservoir;
    selecting a theoretical minimum negative pitch angle of a second plane of the upper surface of the selected amount of oil in the oil reservoir;
    determining a theoretical bottom plane at a selected positive distance above the oil reservoir bottom;
    wherein the oil reservoir has the theoretical maximum positive pitch angle of the first plane of the upper surface of the selected amount of oil in the oil reservoir; the theoretical minimum negative pitch angle of a second plane of the upper surface of the selected amount of oil in the oil reservoir; and the theoretical bottom plane at the selected positive distance above the oil reservoir bottom;
    determining a shape and a size of an oil pick-up tube and of an opening in the oil pick-up tube to locate the opening below the first plane at the maximum positive pitch angle and below the second plane at the minimum negative pitch angle, wherein the opening is defined by a peripheral edge of the oil pick-up tube, wherein the peripheral edge lies substantially within an opening plane, wherein the opening plane has a positive pitch angle of at least 30% of the maximum positive pitch angle;
    fabricating the oil pick-up tube with the shape, the size, and the opening; and
    receiving the oil pick-up tube in the oil reservoir, wherein the oil pick-up tube has a distal end formed with the opening, wherein the opening is located below the first plane at the theoretical maximum positive pitch angle and below the second plane at the theoretical minimum negative pitch angle, wherein the opening is defined by the peripheral edge of the oil pick-up tube, wherein the peripheral edge lies substantially within the opening plane, wherein the opening plane has the positive pitch angle of at least half of the theoretical maximum positive pitch angle.

2. The method of claim 1, wherein the positive pitch angle of the opening plane is from at least 30% of the maximum positive pitch angle to 120% of the maximum positive pitch angle.

3. The method of claim 1, wherein the positive pitch angle of the opening plane is equal to the maximum positive pitch angle and the opening plane is parallel to the first plane.

4. The method of claim 1, wherein determining the shape and the size of the oil pick-up tube and of the opening in the oil pick-up tube comprises locating the peripheral edge at a first positive distance from the first plane, at a second positive distance from the second plane, and at a third positive distance from the oil reservoir bottom.

5. The method of claim 1, further comprising:
    selecting a maximum positive roll angle of a third plane of an upper surface of the selected amount of oil in the oil reservoir; and
    selecting a minimum negative roll angle of a fourth plane of the upper surface of the selected amount of oil in the oil reservoir;
    wherein determining the shape and the size of the oil pick-up tube and of the opening in the oil pick-up tube comprises determining the shape and the size of the oil pick-up tube and of the opening in the oil pick-up tube to locate the opening below the first plane at the maximum positive pitch angle, below the second plane at the minimum negative pitch angle, below the third plane at the maximum positive roll angle, and below the fourth plane at the minimum negative roll angle.

6. The method of claim 1, wherein the oil reservoir bottom defines a reservoir bottom plane, and wherein determining the shape and the size of the oil pick-up tube and of the opening in the oil pick-up tube comprises locating a bottom-most portion of the peripheral edge in a bottom plane parallel to the reservoir bottom plane.

7. The method of claim 1, wherein
    the maximum positive pitch angle of the first plane of the upper surface of the selected amount of oil in the oil reservoir is selected based on inertial forces during a maximum acceleration and/or based on gravity forces when the vehicle is located on an incline; and
    the minimum negative pitch angle of the second plane of the upper surface of the selected amount of oil in the oil reservoir is selected based on inertial forces during a maximum deceleration and/or based on gravity forces when the vehicle is located on a decline.

8. The method of claim 1, wherein
    the minimum negative pitch angle of the second plane of the upper surface of the selected amount of oil in the oil reservoir is selected based on inertial forces during a maximum acceleration and/or based on gravity forces when the vehicle is located on an incline; and
    the maximum positive pitch angle of the first plane of the upper surface of the selected amount of oil in the oil reservoir is selected based on inertial forces during a maximum deceleration and/or based on gravity forces when the vehicle is located on a decline.

9. The method of claim 1, wherein the shape of the oil pick-up tube is Y-shaped and includes a main tube portion configured to extend to an oil pump, a first leg portion configured to extend downward toward the oil reservoir bottom and which terminates at the opening, and a second leg portion configured to extend upward away from the oil reservoir bottom and to a closed end.

10. The method of claim 9, further comprising:
    locating a screen in the oil pick-up tube, wherein the screen extends from the closed end of the second leg portion to the main tube portion.

11. An oil intake system for a vehicle comprising:
an oil reservoir having an internal volume with an internal shape including an oil reservoir bottom, wherein the oil reservoir has:
a theoretical maximum positive pitch angle of a first plane of an upper surface of a selected amount of oil in the oil reservoir;
a theoretical minimum negative pitch angle of a second plane of the upper surface of the selected amount of oil in the oil reservoir;
a theoretical bottom plane at a selected positive distance above the oil reservoir bottom; and
an oil pick-up tube received in the oil reservoir, wherein the oil pick-up tube has a distal end formed with an opening, wherein the opening is located below the first plane at the theoretical maximum positive pitch angle and below the second plane at the theoretical minimum negative pitch angle, wherein the opening is defined by a peripheral edge of the oil pick-up tube, wherein the peripheral edge lies substantially within an opening plane, wherein the opening plane has a positive pitch angle of at least half of the theoretical maximum positive pitch angle.

12. The oil intake system of claim 11, wherein the positive pitch angle of the opening plane is from at least half of the theoretical maximum positive pitch angle to the theoretical maximum positive pitch angle.

13. The oil intake system of claim 11, wherein the positive pitch angle of the opening plane is equal to the theoretical maximum positive pitch angle and the opening plane is parallel to the first plane.

14. The oil intake system of claim 11, wherein the peripheral edge is a first positive distance from the first plane, a second positive distance from the second plane, and a third positive distance from the oil reservoir bottom.

15. The oil intake system of claim 11, wherein:
the oil reservoir has a theoretical maximum positive roll angle of a third plane of the upper surface of the selected amount of oil in the oil reservoir;
the oil reservoir has a theoretical minimum negative roll angle of a fourth plane of the upper surface of the selected amount of oil in the oil reservoir; and
the opening is located below the first plane at the theoretical maximum positive pitch angle, below the second plane at the theoretical minimum negative pitch angle, below the third plane at the theoretical maximum positive roll angle, and below the fourth plane at the theoretical minimum negative roll angle.

16. The oil intake system of claim 11, wherein:
the oil reservoir bottom defines a reservoir bottom plane; and
a bottom-most portion of the peripheral edge is located in a bottom plane parallel to the reservoir bottom plane.

17. The oil intake system of claim 11, wherein:
the oil pick-up tube is Y-shaped and includes a main tube portion configured to extend to an oil pump, a first leg portion configured to extend downward toward the oil reservoir bottom and which terminates at the distal end and opening, and a second leg portion configured to extend upward away from the oil reservoir bottom and to a closed end.

18. The oil intake system of claim 17, further comprising:
a screen located in the oil pick-up tube and extending from the closed end of the second leg portion to the main tube portion.

19. A vehicle comprising:
an engine; and
an oil intake system for the vehicle comprising:
an oil reservoir having an internal volume with an internal shape including an oil reservoir bottom, wherein the oil reservoir has:
a theoretical maximum positive pitch angle of a first plane of an upper surface of a selected amount of oil in the oil reservoir;
a theoretical minimum negative pitch angle of a second plane of the upper surface of the selected amount of oil in the oil reservoir; and
a theoretical bottom plane at a selected positive distance above the oil reservoir bottom; and
an oil pick-up tube received in the oil reservoir, wherein the oil pick-up tube has a distal end formed with an opening, wherein the opening is located below the first plane at the theoretical maximum positive pitch angle and below the second plane at the theoretical minimum negative pitch angle, wherein the opening is defined by a peripheral edge of the oil pick-up tube, wherein the peripheral edge lies substantially within an opening plane, wherein the opening plane has a positive pitch angle of at least half of the theoretical maximum positive pitch angle.

20. The vehicle of claim 19, wherein the positive pitch angle of the opening plane is from at least half of the theoretical maximum positive pitch angle to the theoretical maximum positive pitch angle.

* * * * *